INVENTOR.
LUCIO STABILE
BY
Townsend and Townsend
ATTORNEYS

INVENTOR.
LUCIO STABILE
BY
Townsend and Townsend
ATTORNEYS

United States Patent Office 3,421,065
Patented Jan. 7, 1969

3,421,065
APPARATUS FOR CONTROLLING THE SPEED OF DIRECT CURRENT ELECTRIC MOTORS
Lucio Stabile, Milan, Italy, assignor to Vanguard U.S., Millbrae, Calif.
Filed Sept. 23, 1964, Ser. No. 398,588
Claims priority, application Italy, Oct. 4, 1963, 20,370/63
U.S. Cl. 318—327          10 Claims
Int. Cl. H02p 5/00; H02k 27/20; G05b 5/01

ABSTRACT OF THE DISCLOSURE

Method and apparatus for controlling the speed of direct current electric motors wherein electric energy is made available to the armature of a motor in an amount proportional to an error signal formed by taking the difference between a reference signal and a speed signal and wherein electric energy is made available to the field of the motor at a generally constant level but of a polarity dependent on whether or not the error signal is due to the speed of the motor being less than or greater than the speed called for by the reference signal together with means for absorbing energy delivered by the motor when operating with a reversed field inducing speed reduction of the motor.

---

This invention relates to powering of direct current electric motors, and more particularly to powering of electric motors operating at rigorously controlled speeds independent of load variation or load reversal.

Several systems have been disclosed in the prior art to power and control the speed of direct current motors under conditions of regeneration or overhauling load. One of the systems most commonly used is known as the Ward-Leonard system which includes a rotating motor-generator set used to convert power to the motor and to return power to the line under conditions where regeneration is required. This system, however, has the disadvantage that in order to provide power conversion through a rotating motor-generator set, large and expensive power control components are required, and continued periodic maintenance is necessary, thus increasing the cost of the system. In addition, the motor-generator set employed introduces unwanted time constants and non-linearity into the feedback speed control loop, which degrades the performance of the motor. Other systems employed in the prior art provide conversion and regeneration of power by static means. These systems, however, have been successful only to a limited degree. If the system employs double rectifier bridges, the systems are complex and bulky and require a large number of components. If single rectifier bridges are employed, the control loop has been non-linear; and relatively large time lags, dead bends or discontinuities may be present.

It is accordingly an object of this invention to provide an improved method of powering a direct current motor by static means which permits conversion and regeneration of power.

It is another object of the present invention to provide an improved static system for powering a direct current electric motor having the characteristic of regeneration and the capability of permitting the transmission of the current and absorption of energy by the motor when the latter is operating as such, and the return and recovery of the energy when the motor is overhauled, i.e., functioning as a generator.

It is still another object of this invention to provide an improved static system for powering a direct current motor, including an electric control rectifier bridge which permits recovery of energy when the motor's speed is reduced or the motor is completely stopped.

Other objects of the present invention will become apparent upon reading the following specification and referring to the accompanying drawings in which.

Figure 1:
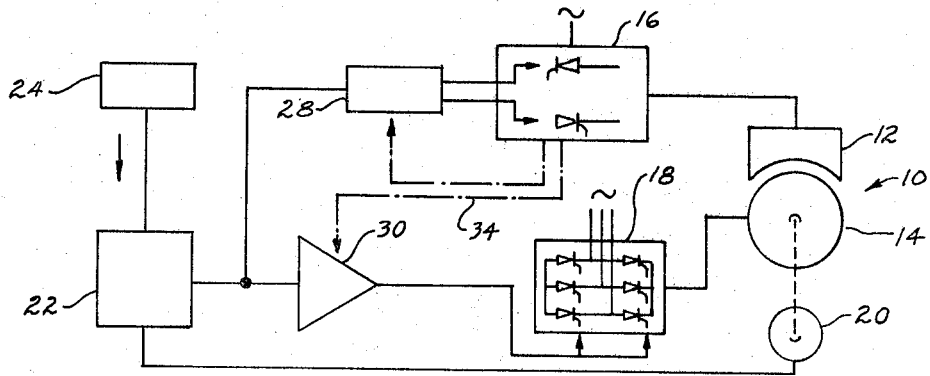
FIGURE 1 is a block circuit diagram of a direct-current motor speed control system embodying the invention.
Figure 6:
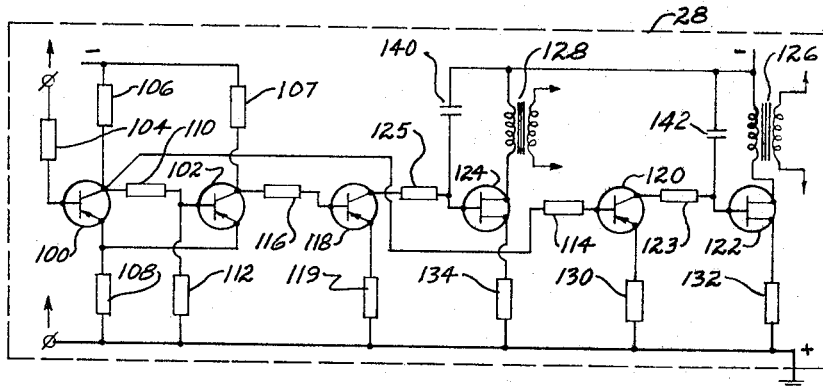
Figure 5:
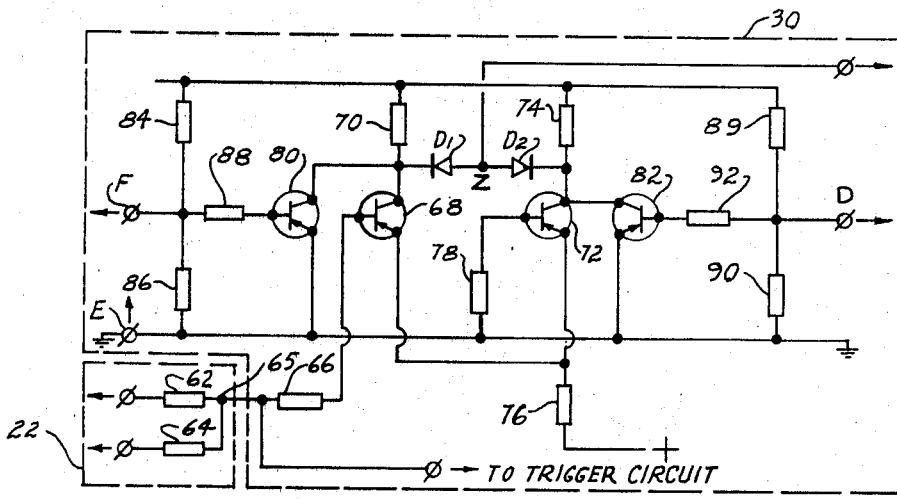

FIGURE 5 is a schematic circuit diagram of the differential amplifier circuit 30 and the comparator circuit 22 shown in FIGURE 1; and FIGURE 6 is a schematic circuit diagram of the trigger circuit 28 shown in FIGURE 1.

Figure 1A:
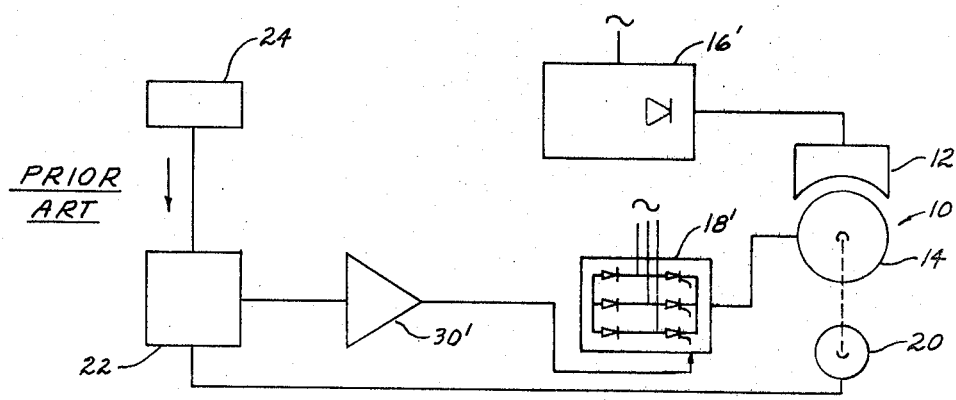
FIGURE 1a is a block circuit diagram of a direct-current motor speed control system employed in the prior art, and which is helpful to describe the advantages of the present invention.

Reference is now made to FIGURES 1 and 1a of the drawings, wherein a D.C. motor powering and speed control system embodying the invention, and a similar system in the prior art are respectively shown.

The same reference numerals are employed in both FIGURES 1 and 1a to indicate similar circuits or circuit elements.

The motor 10, which is a shunt wound direct current motor, for example, includes a field 12 and an armature 14. The field 12 is supplied by a field rectifier circuit 16, shown in detail in FIGURE 4, while the armature 14 is supplied by a power amplifier 18 comprising four or six silicon controlled rectifiers, corresponding to single and three-phase networks respectively, connected in the "Graetz Bridge" configuration. The three-phase network configuration is illustrated in FIGURE 1 of the drawings.

A tachometer dynamo 20 is mechanically coupled to the rotor of the motor 10 to derive a speed signal having an amplitude as a function of the speed of the motor's 10 rotor.

The speed signal is applied to a comparator circuit 22, as a feed back signal, where it is compared to a reference signal derived from a variable reference signal generator circuit 24. The comparator circuit 22 provides an output error signal which is a function of the difference between the reference signal and the speed signal.

The characteristic of the output error signal from the comparator circuit 22 is such that when the speed and reference signals are equal, the amplitude of the error signal is zero. If the speed signal is greater than the reference signal, the error signal will have an amplitude that is a function of the difference in amplitude between the speed and reference signals, as previously mentioned, but the error signal has a positive polarity. If the reference signal, on the other hand, exceeds the speed signal, the error signal is of a negative polarity and has an amplitude depending on the difference in amplitude between the reference and speed signals.

The error signal is simultaneously coupled to a trigger circuit 28 and to a differential amplifier 30. The output signal from the differential amplifier 30 may be deduced from the dynamic characteristic of the amplifier 30 shown in FIG. 2 of the drawings as curve 32. The dynamic characteristic of the differential amplifier is obtained by plotting the output signal from the differential amplifier (the ordinate) as a function of the error signal; input signal to the differential amplifier (the abscissa). Curves 68' and 72' represent the cross-connected characteristic of the active devices comprising the differential amplifier 30, as described in more detail later on. The vertex of the dynamic characteristic of differential amplifier 30, illustrated by solid curve 32, is designed to occur at the origin by the cross-over of the individual characteristics 68' and 72'. The amplitude of curve 32 as previously explained depends on the amplitude of the error signal 26 and the gain of the amplifier 30, but the polarity of curve 32 is always negative regardless of the polarity of the error signal. When the error signal is zero as previously stated, the curve 32 intersects the origin and the output signal is also zero.

The output signal from the trigger circuit 28 is coupled to the field rectifier 16, which in turn supplies the field 12 of the motor 10 with current of a predetermined magnitude independently from the magnitude of the error signal, but with a polarity dependent on the polarity of the error signal.

In operation, assuming that initially no reference voltage is applied to the comparator circuit 22 and that motor armature 14 is not in motion, so that no speed signal is derived at the tachometer 20, the dynamic operation is begun by applying power to the apparatus, i.e., the motor field 12 is powered in the positive direction by the field rectifier circuit 16. Also, a negative reference signal from reference signal generator 24 is applied to the comparator circuit 22 at the initiation of operation of the motor 10.

As long as the speed signal from the tachometer 20 is zero or smaller than the reference signal, the error signal is of a negative polarity. The error signal is simultaneously applied to the trigger circuit 28 and to the differential amplifier 30. An output signal is derived from the differential amplifier 30 at terminal Z and is suitably applied to cause the power amplifier 18 to conduct providing power to the armature 14 of motor 10 causing the armature 14 to accelerate. As the speed of the motor 10 increases, the speed signal increases in amplitude approaching the value of the reference signal, thus reducing the amplitude of the error signal. When the speed signal becomes substantially equal to the reference signal the error signal decreases to a value which is only sufficiently large to maintain the desired speed of the motor 10.

When it is desired to stop the motor or to reduce its speed, the reference signal is reduced. A reduction in the reference signal causes a reversal in the polarity of the error signal, i.e., the error signal becomes positive. The trigger circuit 28, triggered by the positive error signal, causes the current through the field rectifier circuit 16 to reverse direction, whereby the motor field current is reversed rapidly. At the same time the output signal from the differential amplifier 30, which would increase in amplitude due to the increase in error signal, is locked to a desired predetermined value such as zero volts, for example, by mutual interlocking with the field rectifier circuit 16. The interlocking structure is indicated by the dashed line 34 in FIG. 1.

The differential amplifier circuit 30 remains locked until the field current of motor 10 is reversed. After the power amplifier circuit 18 is allowed to conduct the power amplifier operates as an inverter circuit; that is, the motor 10 returns power to the supply while rapidly slowing down to a point where the amplitude of the speed signal approaches the reference signal. The error signal, however, decreases to a slightly negative value to maintain the desired speed of the motor. This in turn requires the motor field to return to its original state and the power amplifier circuit 18 to operate in its original manner.

As described above in reference to the operation of the system, it is clearly evident that one of the advantages of the system is the speed with which the motor can be slowed down or stopped. Most systems disclosed in the prior art have a slow braking characteristic, especially in systems where the control of the motor is a function of the magnitude of the motor field.

In addition, the change in operation from "motor" to "generator," and vice versa, is automatically achieved (as a function of the difference between the reference signal and the signal speed) because the dynamic characteristic provided by the differential amplifier 30 causes the reversible power amplifier 18 to operate with both positive and negative error signals.

As illustrated in FIG. 1a, the reference signal generator 24, the comparator circuit 22 and the tachometer dynamo 20 are all part of systems disclosed in the prior art. The supply circuit 16'; which is typical of circuits disclosed in the prior art, differs from the field rectifier circuit 16 of this invention in that it is unidirectional and not controlled as a function of the error signal. In addition the control amplifier 30', found in the other systems, provides an output signal which may be positive or negative in accordance with the polarity of the error signal and which controls a unidirectional power rectifier circuit 18'.

Figure 4:
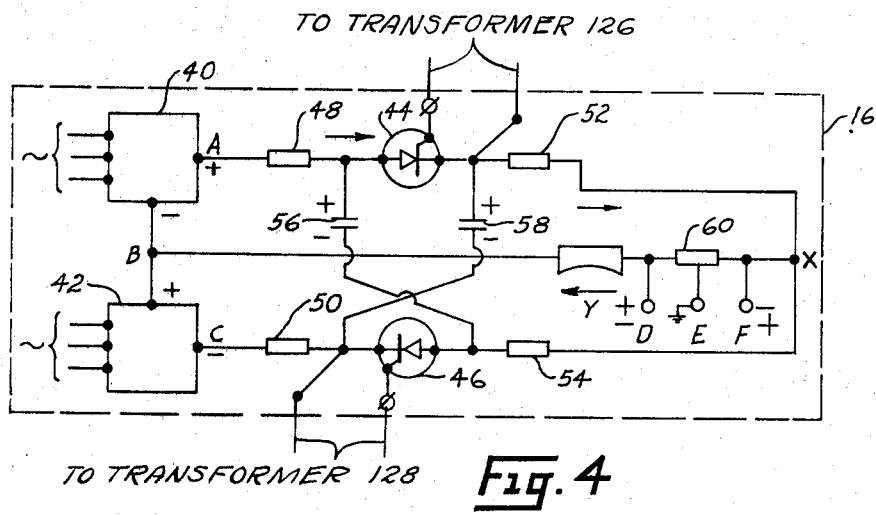
FIGURE 4 is a schematic circuit diagram of the field rectifier circuit 16 shown in FIGURE 1.

Reference is now made to FIG. 4 of the drawings which illustrates the field rectifier circuit 16, shown in FIG. 1, in schematic form.

The field rectifier circuit 16 is an inverter circuit comprising a pair of rectifiers 40 and 42, which may be selenium type rectifier devices and which, as illustrated in the drawings, may be of the three-phase type. As indicated in the drawing the rectifier 40 provides a positive voltage between the terminals A and B while the rectifier 42 provides a negative voltage between the terminals C and B. Terminals A and C are respectively coupled to silicon controlled rectifiers 44 and 46 through resistors 48 and 50.

The anode-cathode current paths of the silicon controlled rectifiers 44 and 46 are completed to a point or terminal X through resistors 52 and 54 respectively. The silicon controlled rectifiers, however, are poled for opposite polarity conduction.

A capacitor 56 is coupled between the anode electrodes of rectifiers 44 and 46, and a capacitor 58 is coupled between the cathode electrodes of rectifiers 44 and 46 to provide a voltage that maintains the desired silicon controlled rectifier nonconductive. The field 12 of electric motor 10 is connected at one end through a resistor 60 to terminal X and at the other end directly to terminal B.

Trigger signals are applied to the field rectifier circuit 16 from the trigger circuit 28. The signals are applied to the gate electrodes of the silicon controlled rectifiers 44 and 46 as a function of the polarity of the error voltage derived at the output terminal of the comparator circuit 22.

In operation, assuming that current is flowing through the anode-cathode current path of silicon controlled rectifier 44, the capacitors 56 is charged with the polarity indicated in the drawings to a value equal to the voltage drop across resistor 52. Assuming that a trigger signal is now applied to the gate electrode of the silicon controlled rectifier 46, the rectifier 46 is rendered conductive and the voltage drop across the resistor 48 is increased for a period of time depending on the time constant of the circuit. This causes the anode potential of rectifier 44 to become less positive than the potential of the cathode electrode of rectifier 44 rendering the rectifier 44 nonconductive. A trigger pulse applied to the rectifier 44 subsequently, will reverse the process and render rectifier 46 nonconductive.

The resistors 48, 50, 52 and 54 are employed to render the rectifiers 44 and 46 nonconductive as previously explained and to reduce the time constant of the motor field circuit, which results in a fast reversal of the field, and hence in the practicality of employing the system embodying the invention.

Figures 2, 3:
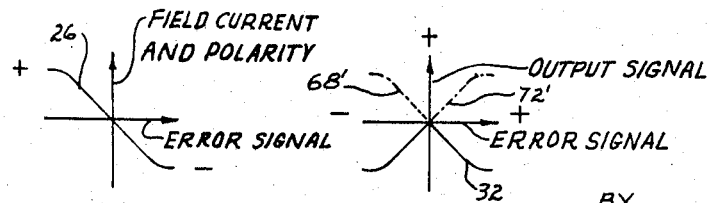
FIGURE 2 is a graph showing the dynamic characteristic of the differential amplifier 30 shown in FIGURE 1.
FIGURE 3 is a graph showing the reversal of field current in the motor 10 with respect to the polarity of the error signal.

Due to the dynamic characteristic of the differential amplifier 30, shown in FIG. 2, and the trigger circuit 28 and rectifier circuit 16, the change between the two sides of operation, i.e., motor field reversal, occurs practically instantaneously. In addition FIG. 3 illustrates that the change to the zero level occurs without modification of the slope of the curve, thereby providing linear control.

Terminals D and F are connected across the resistor 60 and are utilized to derive signals which are proportionate to the field current. These signals are coupled to the differential amplifier 30 to provide the interlocking feature of the differential amplifier 30 previously described and shown in FIG. 1 by dashed line 34. The signals derived at the F terminal are positive with respect to terminal E, which is a terminal connected to a midpoint of resistor 60, a point of fixed potential such as ground. The signals derived at terminal D are positive with respect to ground when current flows in the direction indicated by arrow Y. Since the polarities of the signals at terminals D and F are a result of field current flow in the direction shown by the arrow Y, the polarities are inverted when the field current flow is reversed.

As a result of practical experimentation of the system embodying the invention, field reversal as described above can be advantageously utilized on the fields of motors rated at power in the order of 35 kw. without the use of current regulation means, while if the regulatory means are used, field reversal of motors having much higher power, such as 150 kw., for example, is made possible. Also by virtue of the regulation itself other advantages such as reduction in the field time constant, for example, are obtained. Moreover, it should be noted that the simplicity in the construction and functioning of the field-invertor circuit 16 insures maximum regularity and safety in the operation of the entire apparatus, in addition to the obvious advantages of economy and ease of manufacture.

FIGURE 5, illustrates in schematic form the differential amplifier circuit 30 shown in FIG. 1, and the comparator circuit 22 also shown in FIG. 1.

The comparator circuit 22 comprises resistors 62 and 64 having values determined by the relative magnitudes of the reference and speed signals. Resistors 62 and 64 are connected at a common terminal 65. The terminal 65, in turn, is coupled to the trigger circuit 28 directly, and through a resistor 66 to the base electrode of transistor 68. Signals from the reference signal source 24 and the tachometer dynamo 20 are respectively applied to the resistors 62 and 64. The output or error signal derived at the terminal 64, has an amplitude equal to the difference between the amplitude of the signals applied thereto. When the reference signal exceeds the speed signal, the error signal is negative; if the speed signal exceeds the reference signal, the error signal is positive.

The collector electrode of transistor 68 is coupled through a resistor 70 to a source of operating potential (not shown). Similarly transistor 72, which forms part of the differential amplifier, is coupled through a resistor 74 to a source of operating potential. The emitter electrodes of transistors 68 and 72 are connected to each other and coupled through a resistor 76 to a point of reference potential such as a source of operating potential of the desired polarity (not shown). The base electrode of transistor 72 is in turn referenced to a point of fixed potential such as ground, for example, through a resistor 78.

The dynamic characteristic of transistors 68 and 72 are respectively shown in FIGURE 2 of the drawings as dashed curves 68' and 72'. The solid portion of the curves having been previously described as the dynamic characteristic of the differential amplifier circuit 30. A pair of diodes $D_1$ and $D_2$ are connected back to back between the collector electrodes of transistors 68 and 72. The common anode connection of diodes $D_1$ and $D_2$ comprises the output signal terminal Z, which is electrically coupled to the power amplifier 18. These diodes $D_1$ and $D_2$ are poled to permit operation of the differential amplifier 30 only through the negative portion of its dynamic characteristic, as shown by the solid portion of the graph illustrated in FIG. 2 or curve 32.

The transistors 80 and 82 are employed to provide the "locking" characteristic of the differential amplifier as previously mentioned, which prevents powering of the motor while the motor field is being reversed, and permits the proper operation of the system.

The collector electrodes of transistors 80 and 82 are connected respectively to the collector electrodes of transistors 68 and 72 so that when either transistor 80 or 82 conducts the corresponding collector of transistors 68 and 72 is clamped to zero potential or ground. The emitter electrodes of transistors 80 and 82 are in turn directly grounded.

Resistors 84 and 86 connected in well known manner between a source of operating potential and ground provide the desired biasing to render the transistor 80 normally conductive. The resistor 88 in turn provides desired current limiting for the transistor 80. Similarly, resistors 89 and 90 provide the required biasing to render transistor 82 normally conductive, while the resistor 92 limits the base current of transistor 82. As explained above, the transistors 80 and 82 provide the desired clamping of transistors 68 and 72 while the field is being reversed and hence provide an output signal substantially equal to zero until the desired field reversal is completed.

The locking operation referred to above is controlled by means of the signals derived at terminals D and F of the field rectifier circuit 16 and which are respectively applied to transistors 82 and 80 across resistors 90 and 86. When the field current flows in the direction indicated by the arrow Y, the voltage at terminal F is positive with respect to ground and the voltage at terminal D is negative with respect to ground. When current flow is reversed the polarity of the signals at F and D are respectively reversed. Thus, when the reference signal is increased in the negative direction to provide acceleration of the motor 10, the transistor 68 conducts more heavily and consequently there is a tendency to increase the voltage drop across resistor 76 which results in a decrease in conduction of transistor 72. This in turn decreases the current flow through resistor 76 thereby maintaining constant. This condition is illustrated in FIGURE 2; for example if the input (error) signal is negative conduction is performed in the negative portion of curve 68' (left portion of curve 32), and if the error signal becomes positive, conduction is performed on the negative portion of curve 72' (right portion of curve 32).

Because there is no field reversal, and the current flow in the field rectifier circuit 16 is in the direction indicated by the arrow Y, the signal derived from terminal F remains positive with respect to ground. The signal derived at F which is applied to the transistor 80 maintains that transistor nonconductive whereby the output signal at terminal Z increases as a function of the increase in error voltage. Simultaneously the negative signal derived at terminal D is applied to transistor 82 which conducts heavily clamping the collector of transistor 72 to ground potential. If the reference signal is decreased to decelerate the motor 10, current flows in the circuit illustrated in FIG. 16 in a direction opposite the direction indicated by the arrow Y, whereby the voltage at terminals D and F are reversed with the consequent clumping of transistor 68 and conduction and transistor 72. However, during the field switching interval, both transistors 80 and 82 are rendered conductive due to the normal biasing provided in the circuit 30, whereby the collector electrodes of both transistors 68 and 72 are clamped to ground.

In addition, because the diodes $D_1$ and $D_2$ are cut off when the voltage at the respective collector electrode of transistors 68 and 72 becomes more positive than ground, there is no operation in the positive portion of the dynamic characteristic of transistors 68 and 72.

Transistors 80 and 82 as controlled by the signals from the terminals D and F respectively, clamp the corresponding one of the collector electrodes of transistors 68 and 72 when there is a change in the polarity of the error signal, whereby an output signal substantially equal to zero volts is derived from the output signal terminal Z. This operation permits a decrease of the field during the field reversing or switching interval with the inherent decrease in back EMF without excessive current flow, because the applied voltage is substantially equal to zero during the switching interval.

Reference is now made to FIGURE 6 of the drawings wherein the trigger circuit 28, shown in FIGURE 1 in block form, is illustrated in schematic form.

Transistors 100 and 102 are connected in the well known Schmitt trigger configuration. The error signal from the comparator circuit 22 is coupled through a resistor 104 to the base electrode of transistor 100. The collector electrodes of transistors 100 and 102 are separately coupled through resistors 106 and 107 to a source of operating potential (not shown). The emitter electrodes of transistors 100 and 102, however, are coupled through a single resistor 108 to a point of fixed reference potential, such as ground, for example.

In addition, the collector electrode of transistor 100 is coupled through a resistor 110 to the base electrode of transistor 102. A resistor 112 connected between the base electrode of transistor 102 and ground forms with the resistor 110 a voltage divider biasing network for the transistor 102 so that conduction of the transistor 102 is dependent on the conduction state of transistor 100. For example, assuming that a negative error signal of −.5 v. is applied to the base electrode of transistor 100, the reduction in the voltage across the resistor 112, resulting from the increase in the voltage drop across the resistor 106 due to conduction of transistor 100, is insufficient to maintain the conduction of the transistor 102 and hence the transistor 102 is rendered nonconductive. The current normally flowing through the common emitter resistor 108 is switched from the emitter-collector current path of transistor 102 to the emitter-collector current path of transistor 100 when transistor 102 is rendered nonconductive.

Similarly, when the input signal or error voltage reaches a value of +.5 volt transistor 102 is rendered nonconductive. The biasing voltage divider network provides the desired forward biasing to transistor 102 which is then rendered conductive.

The output signals from the Schmitt trigger circuit are derived respectively across the collector resistors of transistors 100 and 102, and coupled through limiting resistors 114 and 116 to transistors 118 and 120. Transistors 118 and 120 in turn control the unijunction transistors 122 and 124 which are connected in a well known relaxation oscillator pulse generator type circuit ordinarily employed for triggering silicon controlled rectifiers.

The transistor 120 is rendered fully conductive when transistor 102 is conducting, because the voltage applied to the base electrode of transistor 120 from the collector electrode of the nonconductive transistor 100, biases transistor 120 into conduction. At the same time the voltage at the collector electrode of transistor 102 is close to zero volts biasing the transistor 118 to cut off. As previously mentioned, the unijunction transistor 124 generates the impulses for controlling the silicon controlled rectifier 44, shown in FIGURE 4. The control impulses are transmitted through a transformer 126 whose primary winding is connected between the output or base-one electrode of the transistor 122 and a source of operating potential (not shown).

When transistor 100 is conducting, the control impulses for silicon controlled rectifier 46 shown in FIGURE 4, are generated by unijunction transistor 124 and coupled to the rectifier 46 by means of transformer 128.

In order to provide the trigger signal for the silicon controlled rectifiers 44 and 46, capacitors 140 and 142 are respectively connected between the control or emitter electrodes of unijunction transistors 124 and 122 and the source of operating potential (not shown). Capacitors 140 and 142 charge to the breakdown voltage of the corresponding unijunction transistor which then provides a pulse through the corresponding one of transformers 126 and 128 to the silicon controlled rectifier connected thereto.

Resistors 134 and 132 respectively connected to the common or base two electrode of unijunction transistors 124 and 122 are compensation resistors, and transistors 118 and 120 replace the so-called timing-resistor in the typical silicon controlled rectifier trigger circuit. The charging time of pulse charging capacitors 140 and 142 is a function of the signal applied to the base electrode of each of unijunction transistors 122 and 124.

Reference is now made back to FIGURES 1 and 1a of the drawings which respectively show the regenerative and nonregenerative silicon controlled rectifier bridge circuits 18 and 18' known as Graetz-bridge circuits.

The bridge circuit or power amplifier circuit 18 comprises six silicon controlled rectifiers connected in a bridge circuit configuration across the armature 14 of motor 10. The silicon controlled rectifiers may be triggered or fired by means of trigger signals from the differential amplifier 30 applied through appropriate pulse transformers, which may be similar to the trigger circuit shown in FIGURE 6, for example. The secondary winding of each of the pulse transformers may be then connected between the cathode and gate electrodes of the corresponding silicon controlled rectifier.

If the trigger circuit employed is a three-phase circuit, three pulse transformers may be employed, each having two secondary windings, whereby the trigger signals are applied to the silicon controlled rectifiers of each leg of the bridge at predetermined times. Each leg of the bridge, however, receives as alternating current operating voltage between the cathode and anode electrodes of each of the silicon controlled rectifiers in phase with the trigger signals. The operating voltage applied to each leg of the bridge is 120 degrees out of phase with the voltage applied to the adjacent leg.

As described above, the silicon controlled rectifiers are rendered conductive only when the operating alternating current voltage is applied to the particular leg and the trigger pulses are generated. Once the trigger pulse is applied, the silicon controlled rectifier thus energized maintains conduction for the remaining portion of the operating voltage half cycle.

It should be noted, as previously explained in connection with FIGURES 1 and 1a, that once the motor field current is reversed and the EMF voltage across the armature exceeds the voltage at the power amplifier, power is pumped back into the power lines as a result of the regeneration of the power amplifier circuit.

The Graetz-bridge circuit 18' shown in FIGURE 1a is a well known rectifier bridge circuit disclosed in the prior art. Three silicon controlled rectifiers and three selenium or silicon type rectifiers are employed, whereby the circuit 18' has unidirectional flow characteristics. Thus, the circuit 18' differs from the power amplifier circuit 18 in that no regeneration is provided and hence no recovery of power is effected with a reduction of the motor's speed.

It should be understood that changes and variations of the invention may be made without departing from the spirit of the invention, as expressed in the following claims. For example, two standard control amplifiers may be substituted for the differential amplifier 30 shown in FIG. 5 if appropriate signal steering as a function of the polarity of the error signal and signal inversion in one of the amplifiers is provided.

What is claimed is:

1. A speed control system for controlling the speed of a direct current electric motor, in response to the value of a reference signal comprising: means for generating a speed signal having an amplitude which is a function of the motor speed, comparator circuit means responsive to said reference signal and to said speed signal to provide an error signal the amplitude and polarity of which is a function of the difference between the reference and speed signals, a differential amplifier connected to amplify said error signal regardless of polarity, a power amplifier connected to be driven by the output of said differential amplifier, switch means having first and second conditions connected for applying a magnetic field to said motor in a first polarity when in said first condition to cause said power amplifier to drive said motor in proportion to the value of the drive signal and to apply said magnetic field in a second polarity when said switch is in the second condition to cause said power amplifier to draw power from said motor in proportion to said drive signal, trigger means connected to control said switch means in response to said error signal to switch said switch means to said first condition when said error signal is negative and to said second condition when said error signal is positive, and means to deactivate said differential amplifier in response to said switch means during change between said first and second conditions to cause said signal applied to the said power amplifier to be deactivated during the switching interval.

2. A speed control system for controlling the speed of a direct current electric motor, in response to the value of a reference signal comprising: means for generating a speed signal having an amplitude which is a function of the motor speed, comparator circuit means responsive to said reference signal and to said speed signal to provide an error signal the amplitude and polarity of which is a function of the difference between the reference and speed signals, amplifier means connected to amplify said error signal to provide an output signal having the same polarity regardless of the polarity of said error signal, a power amplifier connected to be driven by the output of said differential amplifier, switch means having first and second conditions to apply a magnetic field to said motor in a first polarity when in the first condition, to cause said power amplifier to drive the motor in proportion to the value of the drive signal and to apply said field in a second polarity when said switch is in the second condition to cause said power amplifier to draw power from said motor in proportion to said drive signal, means responsive to the amplitude and polarity of said error signal connected to control said switch means to switch to said first condition when said error signal is negative and to said second condition when said error signal is positive, and means to deactivate said differential amplifier in response to said switch means during a change between said first and second conditions to cause the signal applied to said power amplifier to be deactivated during the switching interval.

3. A supply and speed control system for controlling the speed of direct current electric motor in response to the value of a reference signal comprising in combination: means mechanically coupled to said motor for generating a speed signal having an amplitude which is a function of the motor speed, comparator circuit means responsive to said reference signal and to said speed signal to provide an error signal the amplitude and polarity of which is a function of the difference between said reference and speed signals, amplifier means connected to amplify said error signal to provide an output signal having one polarity regardless of the polarity of said error signal, power amplifier means connected to be driven by the output of said amplifier means, switching means having first and second conditions for applying a magnetic field to said motor in a first polarity when in the first condition to cause said power amplifier means to apply power to said motor in proportion to the value of the drive signal from said amplifier means, and to apply said field in a second polarity when said switching means are in said second condition to cause said power amplifier to draw power from said motor in proportion to said drive signal, means responsive to the amplitude and polarity of said error signal connected to control said switching means to switch to said first condition when said error signal is negative and to said second condition when said error signal is positive, and means to deactivate said amplifier means in response to said switching means during a change in said switching means between said first and second conditions to cause the signal driving said power amplifier means to be deactivated during the switching interval.

4. A speed control for controlling the speed of an electric D.C. motor of the type having an armature and field, in response to the value of a reference signal, comprising: tachometer means coupled to said motor for generating a speed signal having an amplitude which is a function of the motor speed, comparator circuit means responsive to said reference signal and to said speed signal to provide an error signal the amplitude and polarity of which is a function of the difference between said reference and speed signals, amplifying circuit means connected to amplify said error signal to provide an output signal having a predetermined polarity regardless of polarity of said error signal power amplifier means connected to be driven by the output signal from said amplifying circuit means, field switch means having first and second conditions to apply field current to said motor field in a first direction when in the first condition to cause said power amplifier means to drive said motor in proportion to the value of the drive signal of said power amplifier means, and to apply a field current in an opposite direction when said field switch means is in the second condition to cause said power amplifier to draw power from said motor in proportion to said drive signal, switch control means connected to control the direction of current flow through said switch means in response to the polarity of said error signal, to switch said switch means to said first condition when said error signal is negative and to said second condition when said error signal is positive, and means responsive to the direction of current flow through said switching means to deactivate said amplifying circuit means during the interval in which reversal of current flow through said field switch means in effected to cause said signal applied to said power amplifier to be deactivated during the switching interval.

5. A supply and speed control system for controlling the speed of a D.C. electric motor of the type having an armature and field in response to the value of a reference signal comprising: means for generating a speed signal having an amplitude which is a function of the motor speed, comparator circuit means responsive to said reference signal and to said speed signal to provide an error signal, the amplitude and polarity of which is a function of the difference between the reference and speed signals, a differential amplifier circuit having an inverted V-type dynamic characteristic connected to amplify said error signal to provide an output signal having negative polarity regardless the polarity of error signal, a power amplifier connected to be driven by the output signal from said differential amplifier, switch means connected to apply a field current to said motor field to provide a magnetic field to said motor the polarity of which is a function of the direction of the current flow through said switch means to cause said power amplifier to drive the motor in proportion to the value of the signal drive of said power amplifier when said field current flows in a first direction and to cause said power amplifier to draw power from said motor in proportion with said drive signal when said field current flows in an opposite direction, trigger circuit means connected to control said switch means in response to the polarity of said error signal to switch the switch means to cause the field current to flow in said first direction when said error signal is negative and in the opposite direction when said error signal is positive, clamping signal generator means connect to said field to generate a clamping signal when the field current falls below a predetermined limit, and clamping means responsive to the clamping signal connected to said differential amplifier to clamp the output signal from said differential amplifier to a predetermined low signal lever, whereby the power supply is at a low energy level when the field current flow is low during the interval in which the direction of the field current flow is being reversed.

6. A speed control system for controlling the speed of a direct current electric motor of the type having an armature and field, in response to the value of a reference signal, comprising: means for generating a speed signal having an amplitude which is a function of the motor speed, comparator circuit means responsive to said reference signal and to said speed signal to provide an error signal the amplitude and polarity of which is a function of the difference between the reference and speed signals, a differential amplifier connected to amplify said error signal regardless of polarity having first and second amplifying devices, each having output electrodes for deriving an output signal, a power amplifier connected to be driven by the output signal from said differential amplifier, switch means having first and second condition to apply a magnetic field to said motor in a first polarity when in the first condition to cause said power amplifier to drive the motor in proportion to the value of the power amplifier drive signal and to apply said field in an opposite polarity when said switch is in said second condition to cause said power amplifier to draw power from said motor in proportion to said drive signal, trigger means connected to control said switch means in response to said error signal to switch said switch means to said first condition when said error signal is negative and to said second condition when said error signal is positive, and third and fourth amplifying devices each having output electrodes respectively connected to said output electrodes of said first and second devices of said differential ammplifier to clamp a desired one of said output electrodes of said first and second devices to a predetermined fixed reference potential as a function of the condition of said switch means, and to clamp both output electrodes of said first and second devices to said fixed potential during the interval when said switch means changes between said first and second conditions to cause said output signal to have a value equal to the value of said fixed reference potential.

7. A speed control system as described in claim 6 wherein the differential amplifier has a V-type dynamic characteristic the vertex of which is at the level of the zero value of the output signal and occurs at the instant of the reversal of the polarity of the error signal applied to the input of said differential amplifier.

8. A speed control system as described in claim 6 wherein the trigger means comprise first and second silicon controlled rectifier devices each poled in series with said motor field but in opposite direction with respect to each other so that when said error signal is of a first polarity said first silicon controlled rectifier is triggered into conduction and current flows through said motor field in a first direction, and when said error signal is of an opposite polarity said second rectifier device is triggered into conduction and current flows through said rectifier device in an opposite polarity.

9. A speed control system for controlling the speed of a shunt wound direct current electric motor, in response to the value of a reference signal comprising: means including a tachometer coupled to said servo-mechanism motor to provide a speed signal having an amplitude which is a function of the motor speed, and a comparator circuit responsive to said reference signal and to said speed signal to provide an error signal the amplitude and polarity of which is a function of the difference between the reference and speed signals; a differential amplifier connected to amplify said error signal to provide an output signal having a negative polarity regardless of the polarity of said error signal, a power amplifier including a plurality of silicon controlled rectifiers connected, in a Graetz-bridge configuration, to be driven by the output of said differential amplifier, switch means including first and second silicon controlled rectifiers oppositely poled with respect to each other and each serially connected electrically with the motor field, trigger means, including a Schmitt trigger stage, responsive to the amplitude and polarity of said error signal having two output terminals each connected to a different one of said first and second silicon controlled rectifiers to trigger said first rectifier device to a conductive condition and said second silicon controlled rectifier device to a nonconductive condition when said error signal is of said first polarity to provide current flow in a first direction and to trigger said second rectifier device to a conductive condition and the first silicon controlled rectifier to a non-conductive condition when said error signal is of the opposite polarity to provide current flow in a second direction said motor connected so that when field current flows in a first direction said power amplifier is caused to apply power to the motor in proportion to the power amplifier drive and when said field current flows in a second direction said power amplifier is caused to draw power from said motor in proportion to said drive signal; said differential amplifier responding in an operating condition when supplied with one of a first and second control signals and to clamp into a non-operating condition when said first and second signals are removed, means connected to said first and second silicon controlled rectifier to provide the first control signal only when said first silicon controlled rectifier is conducting and said second silicon controlled rectifier is in a nonconductive condition and to provide the second control signal only when said second silicon controlled rectifier is in a conducting condition and the first silicon controlled rectifier is in a nonconducting condition, whereby said differential amplifier is clamped in a nonoperating condition during the interval said switch means is being changed between first and second conditions.

10. A speed control device for a motor having a separately energized field and armature comprising: a reference signal generator to generate a signal the value of which will determine the motor speed, means to generate a speed signal responsive in value to the motor speed, means connected to said reference and speed signals to provide a motor control signal proportional to the difference between said reference and speed signals, motor power supply means responsive to said control signal responding to be at an energy level proportionate to the value of said control signal, switch means operative in a first and second conditions to switch the field to a polarity which will cause the polarity of the current in the power supply to drive the armature of the motor when said switch means is in a first condition and the polarity of the current to the field to the opposite polarity to cause the power supply to draw current from the armature of said motor when in the second condition, switch activating means connected to activate said switch means to the first condition when the reference signal is greater than the speed signal and to the second condition when the speed signal is less than the reference signal, and means responsive to the amount of current flow through the field to clamp said power supply to a predetermined low level during the interval when the current through the field drops below a predetermined limit, whereby loss of field current during transfer of said switch means will clamp the energy level of the power supply to prevent damage to said motor.

References Cited

UNITED STATES PATENTS

| | | |
|---|---|---|
| 2,783,427 | 2/1957 | Bracutt. |
| 3,046,464 | 7/1962 | Miller. |
| 3,071,999 | 1/1963 | Thorn. |
| 3,154,730 | 10/1964 | Houldin et al. |
| 3,252,069 | 5/1966 | Ringrose. |

ORIS L. RADER, *Primary Examiner.*

B. A. COOPER, *Assistant Examiner.*

U.S. Cl. X.R.

318—329, 338, 311